United States Patent
Gui et al.

(10) Patent No.: US 6,722,121 B2
(45) Date of Patent: Apr. 20, 2004

(54) CONTROL STRATEGY FOR REGENERATING A NOX ADSORBER CATALYST IN AN EXHAUST SYSTEM OF AN ENGINE HAVING A VARIABLE VALVE ACTUATION MECHANISM

(75) Inventors: Xinqun Gui, Naperville, IL (US); Jinhui Sun, Bloomington, IL (US); Steven T. Omachi, Niles, IL (US); Xiaoyan Lei, Naperville, IL (US); Russell P. Zukouski, Bolingbrook, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/200,711

(22) Filed: Jul. 22, 2002

(65) Prior Publication Data

US 2004/0011025 A1 Jan. 22, 2004

(51) Int. Cl.⁷ .................................................. F01N 3/00
(52) U.S. Cl. .............................. 60/285; 60/278; 60/280; 60/295; 60/297; 123/90.15
(58) Field of Search .......................... 60/274, 285, 278, 60/280, 295, 297, 286; 123/90.15, 90.16, 90.17, 90.18

(56) References Cited

U.S. PATENT DOCUMENTS

| 5,848,529 | A | * | 12/1998 | Katoh et al. | .................. | 60/274 |
| 6,195,987 | B1 | * | 3/2001 | Miyashita | .................... | 60/285 |
| 6,314,725 | B1 | * | 11/2001 | Wakui | .......................... | 60/295 |
| 6,393,832 | B1 | * | 5/2002 | Kolmanovsky et al. | ....... | 60/286 |
| 6,467,258 | B1 | * | 10/2002 | Jobson et al. | ................. | 60/285 |
| 6,499,291 | B2 | * | 12/2002 | Lang et al. | .................... | 60/277 |
| 6,526,745 | B1 | * | 3/2003 | Ogiso | ........................... | 60/285 |
| 6,594,987 | B2 | * | 7/2003 | Uranishi | ...................... | 60/277 |

\* cited by examiner

*Primary Examiner*—Binh Tran
(74) *Attorney, Agent, or Firm*—Dennis Kelly Sullivan; Susan L. Lukasik; Jeffrey P. Calfa

(57) ABSTRACT

A control (30) for controlling a variable valve actuation mechanism (26) of an internal combustion engine (10) to regenerate a NOx adsorber catalyst (35) in the exhaust system (22) of the engine. The control comprises an operating program (50) for regenerating the catalyst while the engine is running under its own power by causing the variable valve actuation mechanism to change the timing of operation of the intake valves (18) so as to transition the fuel-air ratio of mixture that is being combusted in the cylinders (16) from a relatively leaner mixture to a mixture that sufficiently richer than stoichiometric to effectively regenerate the catalyst.

27 Claims, 3 Drawing Sheets

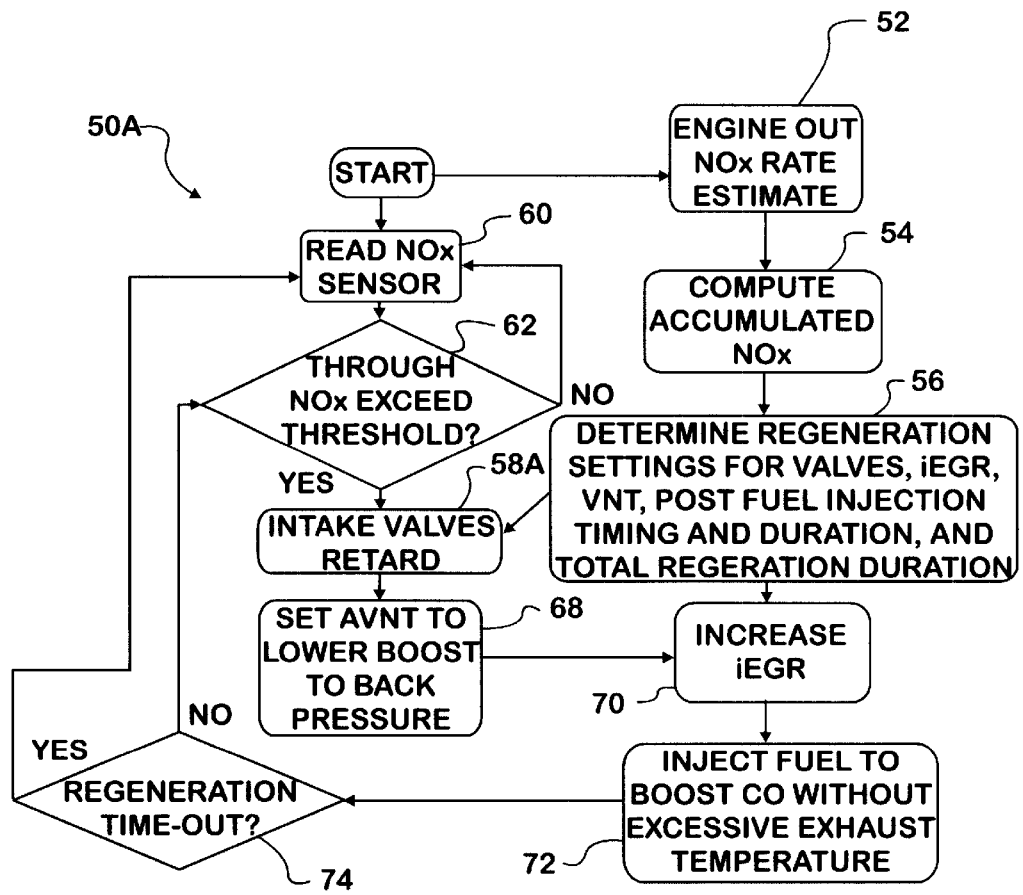
FIG. 4
FIG. 5
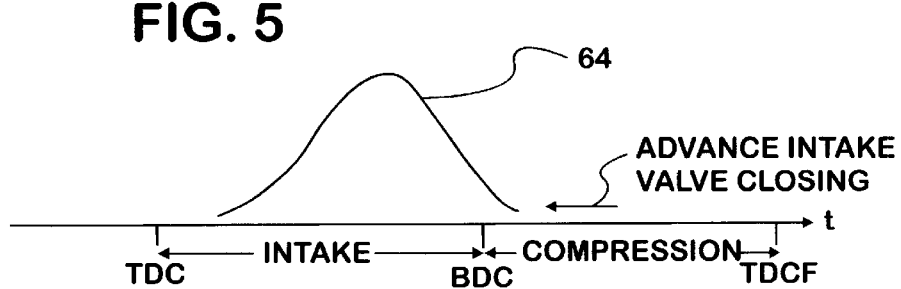

CONTROL STRATEGY FOR REGENERATING A NOX ADSORBER CATALYST IN AN EXHAUST SYSTEM OF AN ENGINE HAVING A VARIABLE VALVE ACTUATION MECHANISM

FIELD OF THE INVENTION

This invention relates generally to internal combustion engines that propel motor vehicles and have both a variable valve actuation mechanism and a NOx adsorber catalyst for adsorbing Nox (oxides of nitrogen) in engine exhaust. A more particular aspect of the invention relates to a control strategy for regenerating the catalyst through use of the variable valve actuation mechanism.

BACKGROUND AND SUMMARY OF THE INVENTION

Oxides of nitrogen have been identified as contributors to smog. A NOx adsorber catalyst placed in the exhaust system of an internal combustion engine can adsorb substantial amounts of oxides of nitrogen from engine exhaust passing through it so that they do not escape to the ambient atmosphere. A NOx adsorber catalyst may offer an advantage over those catalysts that are intended to be used with internal combustion engines running mainly at stoichiometric because it can allow an engine to run on a relatively leaner fuel-air mixture that renders the engine somewhat more efficient than when running at stoichiometric or richer.

As the engine operates, the NOx adsorber catalyst adsorbs more and more oxides of nitrogen and eventually must be regenerated. Generally speaking, a NOx adsorber catalyst adsorbs NOx in engine exhaust when the engine is running relatively leaner. The catalyst is regenerated by temporarily enriching the fuel-air mixture, resulting in release of the adsorbed oxides of nitrogen as gaseous nitrogen and water through catalytic aided chemical processes.

Known methods for enriching a fuel-air mixture for regeneration of a NOx adsorber catalyst include the use of intake throttling and external exhaust gas recirculation (EGR) in conjunction with control of engine fueling. The process may also be controlled by the use of feedback from a suitable exhaust sensor.

It is believed that the present invention can provide more efficient regeneration of a NOx adsorber catalyst and/or the capability for regenerating the catalyst essentially with inclusion of a suitable operating program in the engine control and without additional hardware.

When an engine has a variable valve actuation mechanism under control of a processor-based engine control, the timing of the opening and closing of cylinders valves, i.e. intake and/or exhaust valves, can be varied. The invention arises from a recognition that the variable valve actuation mechanism, in conjunction with proper fuel injection management, can be used to transition the fuel-air ratio between lean and rich without an external throttle in the intake system of the engine. Proper transitioning of the fuel-air ratio can efficiently regenerate a NOx adsorber catalyst in the engine exhaust system.

By varying the timing of intake valve operation through the use of a variable valve actuation mechanism, the amount of charge air that is captured in an engine cylinder and subsequently compressed can be controlled. Control of fueling in conjunction with control of intake valve timing will control fuel-air ratio, and with both fueling and valve timing being under control of a processor-based engine control, fuel-air ratio can be effectively controlled in a manner that is both fast and accurate.

As a piston is downstroking in an engine cylinder during an intake stroke, the corresponding intake valve is typically open. As the piston reaches bottom dead center (BDC) and begins a compression upstroke, the volume of the cylinder begins to decrease. If the intake valve remains open, some of the charge air will be forced through it back into the intake system. The time at which the intake valve closes therefore determines the amount of air that will remain in the cylinder for compression. Setting the amount of fuel to be injected for that amount of trapped air therefore establishes the fuel-air ratio of the mixture that will be combusted when the mixture ignites under the force of compression by the piston as the compression upstroke concludes. At each operating condition, there is an optimum intake valve closing for fuel economy and air-fuel ratio. Retarding intake valve closing pushes air in a cylinder back into the intake system, and advancing intake valve closing shortens the intake stroke. Therefore, retarding intake valve closing or advancing intake valve closing during the engine cycle result in a lesser amount of air in the combusted mixture, and hence a richer mixture for a given amount of fuel.

If the engine has a turbocharger, the regeneration process should take that fact into account and may temporarily alter turbocharger operation in a manner that enables the desired regeneration to be accomplished with effectiveness and efficiency.

Principles of the invention can be embodied in an engine control as part of an overall engine control strategy. The creation of an engine and an operating strategy that can regenerate a NOx adsorber catalyst in conjunction with an overall control strategy, is seen to be a desirable objective because it can make the regeneration process transparent to an operator of the vehicle, requiring no special measures on his or her part.

The present invention attains the desired objective through the control of the variable actuation mechanism for the engine cylinder valves by an engine control system embodying solid-state, processor-based electronics. The processor can process certain data inputs to develop data outputs defining valve opening and closing times that are most appropriate to the inventive strategy. The data outputs are converted into electric signals that are delivered via electric circuits to actuators of the variable valve actuation mechanism to open and close the intake valves at proper times for accomplishing regeneration.

Because certain principles of the present invention include changing the time in the engine operating cycle when the intake valves for the engine cylinders open and close, the variable valve actuation mechanism of the engine must be effective on each such cylinder valve. It may also be effective on exhaust valves. An example of such a mechanism comprises an electric actuator for opening and closing each corresponding cylinder valve in accordance with the electric signal applied to the actuator. This type of engine is sometimes referred to as a camless engine.

The invention is believed to provide an advantageous solution for regeneration because it is possible to implement in an existing engine at no added hardware cost by providing the processor with an operating program embodying an appropriate algorithm, provided that the engine, has a processor-based control and a variable valve actuation mechanism for at least the cylinder intake valves. When the variable valve actuation mechanism also controls timing of the cylinder exhaust valves, they may be timed in relation to intake valve timing to provide internal exhaust gas recirculation (iEGR) for use as a factor in the regeneration strategy. Procedures for initiating and terminating regeneration are also disclosed.

Accordingly, a fundamental aspect of the present invention relates to a novel strategy for regeneration of a NOx adsorber catalyst in an exhaust system of an internal combustion engine, especially a compression ignition, or diesel, engine that also has a variable valve actuation mechanism for varying the timing of at least the cylinder intake valves.

One general aspect of the claimed invention relates to a method of regenerating a NOx adsorber catalyst that adsorbs NOx in exhaust passing through an exhaust system of an internal combustion engine that has a variable valve actuation mechanism for varying the opening and closing times of intake valves that control flow into cylinders of the engine from an intake system. The method comprises, with the engine running under its own power, operating the variable valve actuation mechanism to change the timing of operation of the intake valves so as to transition the fuel-air ratio of mixture that is being combusted in the cylinders from a relatively leaner mixture to a mixture that is sufficiently richer than stoichiometric to effectively regenerate the catalyst.

Another general aspect relates to an engine that embodies a control for performing the foregoing method.

still another general aspect relates to a control for controlling a variable valve actuation mechanism of an internal combustion engine to regenerate a NOx adsorber catalyst in an exhaust system of the engine while the engine is running under its own power. The control causes the variable valve actuation mechanism to change the timing of operation of the intake valves so as to transition the fuel-air ratio of mixture that is being combusted in the cylinders from a relatively leaner mixture to a mixture that is sufficiently richer than stoichiometric to effectively regenerate the catalyst.

The foregoing, along with further aspects, features, and advantages of the invention, will be seen in this disclosure of a presently preferred embodiment of the invention depicting the best mode contemplated at this time for carrying out the invention. This specification includes drawings, briefly described below, and contains a detailed description that will make reference to those drawings.

BRIEF DESCRIPTION OF THE DRAWINGS

FIG. 4 is an exemplary flow diagram of an alternate algorithm that can be used in practicing the invention.

FIG. 5 is a representative timing diagram for intake valves in accordance with FIG. 4.

DESCRIPTION OF THE PREFERRED EMBODIMENT

Figure 1:
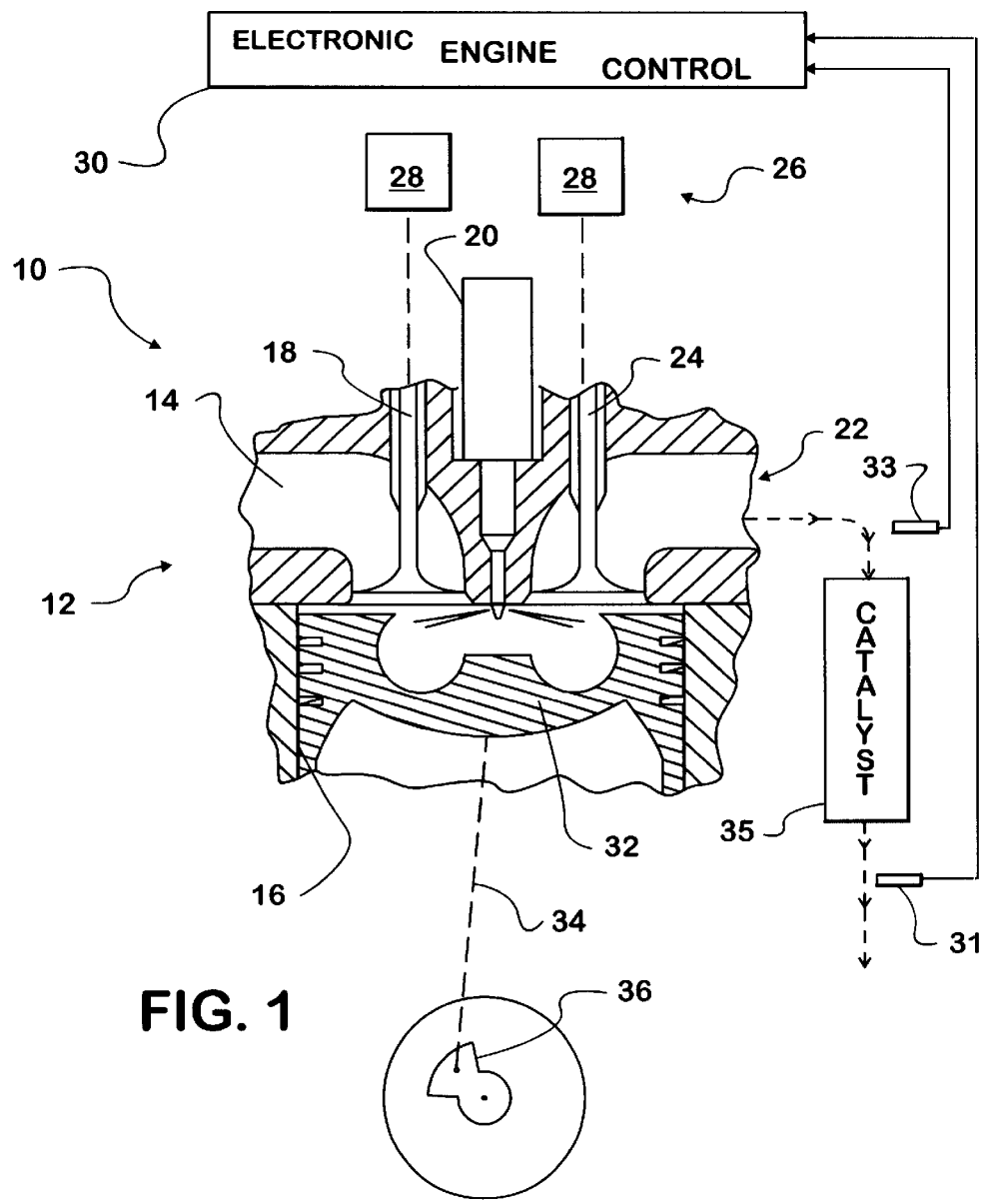
FIG. 1 is a general schematic diagram of an exemplary compression ignition engine, in accordance with principles of the present invention.

FIG. 1 illustrates a multi-cylinder internal combustion engine 10 that powers a motor vehicle. An example of such a vehicle is a truck having a chassis containing a powertrain in which engine 10 is a fuel-injected diesel engine operatively coupled through a drivetrain to driven wheels for propelling the vehicle.

Engine 10 comprises an intake system 12, including an intake manifold 14, through which charge air is delivered to cylinders 16 of engine 10. Charge air enters each engine cylinder 16 from manifold 14 via a corresponding intake valve 18. Individual fuel injectors 20 inject diesel fuel into individual engine cylinders in properly timed relation to engine operation. Engine 10 also comprises an exhaust system 22 for conveyance of exhaust gases created by combustion within the engine cylinders from the engine. Exhaust gases pass out of each cylinder via a respective exhaust valve 24 into the exhaust system.

Engine 10 comprises a variable valve actuation mechanism 26 that allows the time of intake valve opening and closing and the time of exhaust valve opening and closing to be varied. Such an engine is sometimes referred to as may be a camless engine, meaning one where each of the normally closed intake and exhaust valves is opened at a desired time in the engine operating cycle by applying an electric signal to a respective electric actuator 28. Termination of the signal results in re-closing of the associated valve.

An electronic engine control 30 that possesses digital processing capability is associated with engine 10. Control 30 may comprise one or more processors that process data from various input data sources in accordance with one or more programmed algorithms to provide an operating program that generates certain data for performance of various functions associated with operation of engine 10. Certain data processed by control 30 represents variables and may originate at external sources (input variables) and/or be generated internally of control 30 (local variables). Other data may be programmed into and stored in control 30. From input and/or programmed data, control 30 develops data for operating the intake and exhaust valve actuators 28 and for operating fuel injectors 20.

Exhaust system 22 further comprises a NOx adsorber catalyst 35 that adsorbs NOx in the exhaust flow to limit the amount that passes through to the ambient surroundings. Catalyst 35 periodically requires regeneration. Regeneration involves removal of the adsorbed NOx, and this can be accomplished by increasing the concentration of carbon monoxide (CO) passing through the catalyst. Regeneration is initiated by an operating program that is resident in control 30.

Data used in the disclosed example of operating program includes the concentration of NOx in the exhaust after passing through catalyst 35. That data is obtained from a NOx sensor 31 that is typically a standard component of the engine system when catalyst 35 is present. An exhaust temperature sensor 33 may also provide temperature data for processing.

Engine 10 further comprises a kinematic mechanism, including pistons 32 that reciprocate within cylinders 16 and are coupled by rods 34 to a crankshaft 36. When running, the engine executes the usual 720° engine cycle comprising intake, compression, power, and exhaust strokes, each of the four strokes being of 180° duration. Intake and power strokes occur on downstrokes of pistons 32 while compression and exhaust strokes occur on upstrokes. As injected fuel is combusted in cylinders 16 during each engine cycle, the energy of combustion is converted to crankshaft output torque to run the engine and operate the motor vehicle.

Engine control 30 contains a software operating program that implements the one or more algorithms used for control of engine operation, including control of timing of valves 18 and 24 via mechanism 26, and fueling of cylinders 16 via fuel injectors 20. One of the algorithms is embodied as an operating program for causing regeneration of catalyst 35 in accordance with principles of the present invention. An example of such an algorithm is presented in FIG. 2 where it is designated by the reference numeral 50.

When algorithm 50 is executed, it performs various steps that result in the performance of certain functions involving engine 10. Initially, algorithm 50 determines whether catalyst 35 needs regeneration. Two parallel evaluations are made. One involves estimating the rate of NOx generation by engine 10 (step 52), and from the estimate, calculating the amount of NOx adsorbed by catalyst 35 (step 54). When the calculation discloses that the accumulation has reached a predefined amount, regeneration is initiated. A step 56 then performs various calculations that result in settings for various parameters relevant to the regeneration process, as set forth in FIG. 2. The actual regeneration process is initiated by retarding intake valve closing (step 58), as described above.

The second evaluation (steps 60 and 62) is performed by processing data from NOx sensor 31. The data from step 60 is compared by step 62 with a predefined threshold that defines a NOx concentration in the exhaust calling for catalyst regeneration. If the measured concentration exceeds the threshold, regeneration is initiated by retarding intake valve closing (step 58).

Figure 3:
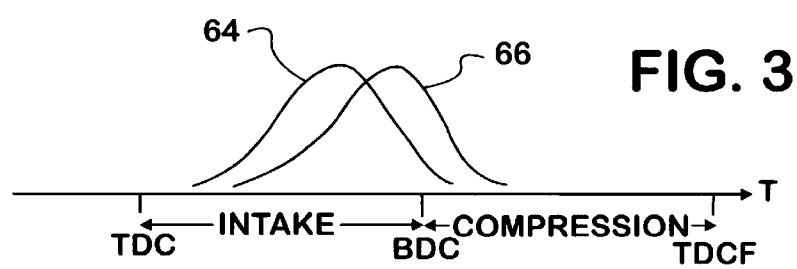
FIG. 3 is a representative timing diagram for intake valves illustrating certain principles of the invention.

FIG. 3 graphically shows an example of retarding intake valve closing. Trace 64 relates the extent of opening of an intake valve 18 for a respective cylinder in relation to the intake and compression strokes of the corresponding piston 32 before its closing is retarded. Trace 66 shows the extent of opening of the intake valve in relation to the intake and compression strokes after its closing has been retarded.

If engine 10 has a turbocharger operated by the exhaust for boosting pressure in intake system 12, step 68 of algorithm 50 causes the turbocharger to assume an operating condition that makes pressure in intake system 12 substantially equal to pressure in exhaust system 22 as catalyst 35 is being regenerated. A reason for assuring that the pressures are substantially equal is to enable internal exhaust gas recirculation (iEGR) to be used in the regeneration process.

Internal exhaust gas recirculation (iEGR), as described and claimed in commonly owned, co-pending application Ser. No. 10/115,193, filed Apr. 2, 2002, is represented by step 70 and can be accomplished during an intake stroke of a piston 32. Before opening the respective intake valve 18 during the intake downstroke, the respective exhaust valve 24 that was closing, either fully or at least partially, as the immediately preceding exhaust upstroke was concluding, is commanded to re-open and then reclose. This allows the intake stroke to initially draw some air from exhaust system 22 back into cylinder 16, providing iEGR. As the re-opened exhaust valve is re-closing, the respective intake valve begins to open. The reader can appreciate that variable valve actuation mechanism 26 must therefore have the capability of operating the exhaust valves as well as the intake valves.

Additional fuel can also be injected (step 72) to further increase the carbon monoxide concentration in the exhaust. As regeneration proceeds, exhaust temperature can be monitored by sensor 33. If too high a temperature is measured, parameters can be adjusted toward reducing the temperature so that it does not exceed a predetermined limit.

Figure 2:
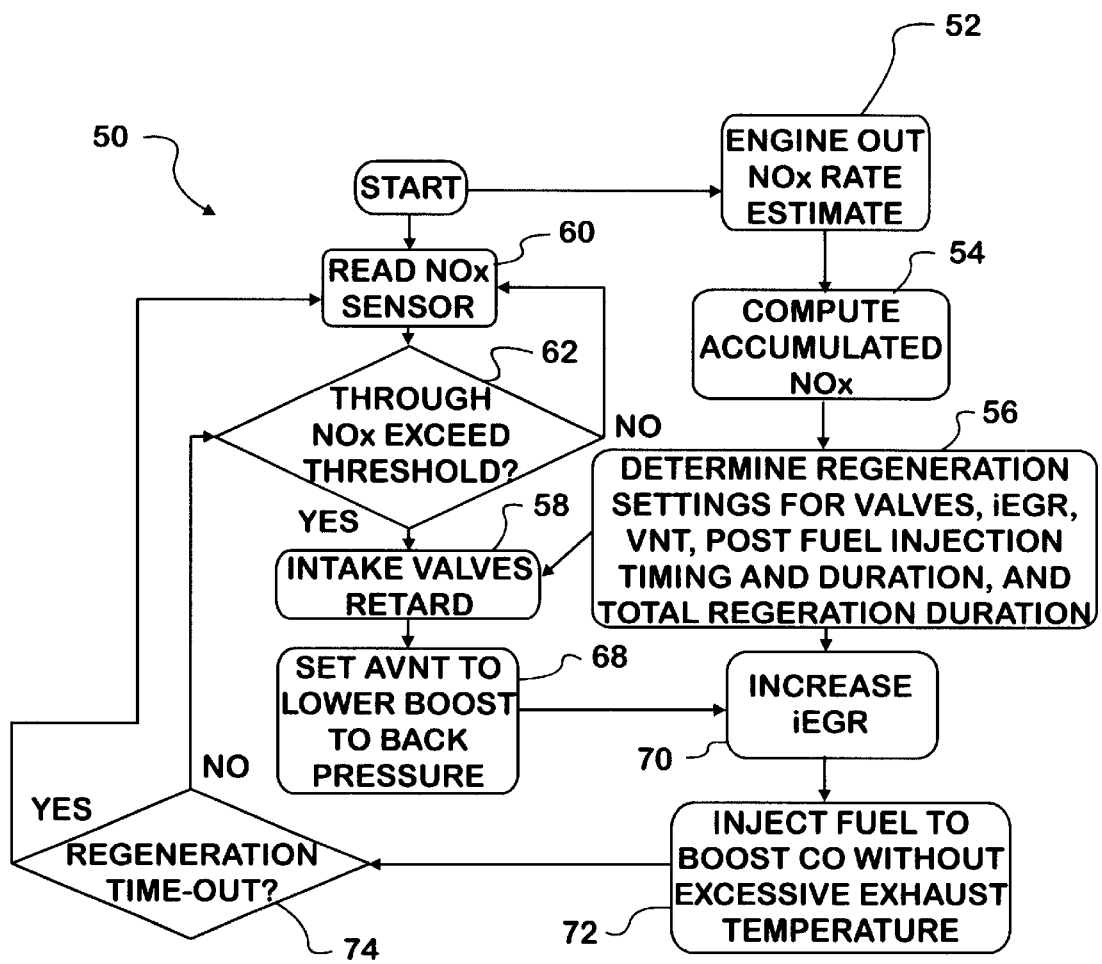
FIG. 2 is an exemplary flow diagram of an algorithm used in practicing the invention.

The remainder of FIG. 2 illustrates how regeneration can be terminated. Control 30 measures the elapsed time of regeneration by means of a timer (step 74). As the timer is timing, NOx concentration in exhaust that has passed through the catalyst is periodically sensed (step 60). Regeneration is terminated at the earlier occurrence of a) the elapsed time exceeding a predefined time limit, and b) the sensed NOx concentration being below a predefined threshold. The operating program becomes inactive except to the extent of periodically processing data from sensor 31. Whenever the threshold of step 62 is exceeded, the operating program once again becomes active and initiate regeneration once again.

FIGS. 4 and 5 relate to another algorithm 50A, that is like algorithm 50 except in one respect, namely, step 58. Instead of retarding intake valve closing, algorithm 50A replaces step 58 by the step 58A of advancing intake valve closing toward bottom dead center. The closing may still occur during the piston upstroke, however, closing may be advanced even further to occur at, or even before, BDC. It is believed that algorithm 50A may, for certain engine conditions, be more realizable than algorithm 50 in creating a higher CO concentration and providing potentials for using multiple fuel injection strategies.

From the foregoing description, the reader can appreciate that control of variable valve actuation mechanism 26 is fundamental to the inventive strategy. Additional control functions may also be performed incidental to, and/or in concert with, this fundamental control to achieve the most efficient regeneration. Exhaust temperature is limited during regeneration. The process is transparent to the vehicle operator.

While a presently preferred embodiment of the invention has been illustrated and described, it should be appreciated that principles of the invention are applicable to all embodiments and uses that fall within the scope of the following claims.

What is claimed is:

1. A method of regenerating a NOx adsorber catalyst that adsorbs NOx in exhaust passing through an exhaust system of a turbocharged diesel engine that has a variable valve actuation mechanism for varying the opening and closing times of intake valves that control flow into cylinders of the engine from an intake system and of exhaust valves that control flow from the cylinders into the exhaust system, the method comprising:

with the engine running under its own power, operating the variable valve actuation mechanism to change the timing of operation of the intake valves so as to transition the fuel-air ratio of mixture that is being combusted in the cylinders from a relatively leaner mixture to a mixture that is sufficiently richer than stoichiometric to effectively regenerate the catalyst and to change the timing of operation of the exhaust valves in coordination with control of turbocharging so as to provide some degree of internal exhaust gas recirculation within the cylinders.

2. A method as set forth in claim 1 wherein the step of operating the variable valve actuation mechanism to change the timing of operation of the intake valves comprises advancing the closing of the intake valves toward bottom dead center.

3. A method as set forth in claim 1 further including the steps of sensing NOx concentration in exhaust that has passed through the catalyst and of initiating the regeneration method when the sensed NOx concentration exceeds a predefined threshold.

4. A method as set forth in claim 1 further including the steps of estimating the rate at which NOx is being generated, calculating from the estimate the amount of NOx adsorbed by the catalyst, and of initiating the regeneration method when the calculation exceeds a predefined threshold.

5. A method of regenerating a NOx adsorber catalyst that adsorbs NOx in exhaust passing through an exhaust system of an internal combustion engine that has a variable valve actuation mechanism for varying the opening and closing times of intake valves that control flow into cylinders of the engine from an intake system, the method comprising:

with the engine running under its own power, operating the variable valve actuation mechanism to change the timing of operation of the intake valves so as to transition the fuel-air ratio of mixture that is being cornbusted in the cylinders from a relatively leaner mixture to a mixture that is sufficiently richer than stoichiometric to effectively regenerate the catalyst, wherein the step of operating the variable valve actuation mechanism to change the timing of operation of the intake valves comprises retarding the closing of the intake valves during compression strokes of pistons in the cylinders.

6. A method of regenerating a NOx adeorber catalyst that adsorbs NOx in exhaust passing through an exhaust system of an internal combustion engine that has a variable valve actuation mechanism for varying the opening and closing times of intake valves that control flow into cylinders of the engine from an intake system, the method comprising:

with the engine running under its own power, operating the variable valve actuation mechanism to change the timing of operation of the intake valves so as to transition the fuel-air ratio of mixture that is being combusted in the cylinders from a relatively leaner mixture to a mixture that is sufficiently richer than stoichiometric to effectively regenerate the catalyst, wherein the variable valve actuation mechanism also varies the opening and closing times of exhaust valves that control flow from the cylinders into the exhaust system, and the method further includes the step of operating the variable valve actuation mechanism to change the timing of operation of the exhaust valves so as to provide some degree of internal exhaust gas recirculation within the cylinders as the catalyst is being regenerated.

7. A method as set forth in claim 6 wherein the engine further includes a turbocharger operated by the exhaust for boosting pressure in the intake system, the method further includes the step of causing the turbocharger to assume an operating condition where pressure in the intake system is substantially equal to pressure in the exhaust system as the catalyst is being regenerated.

8. A method as set forth in claim 7 including the steps of then increasing fueling so as to increase the carbon monoxide (CO) content of exhaust passing through the catalyst during regeneration and of controlling the increased fueling to limit temperature of the exhaust to a predefined limit.

9. A method as set forth in claim 6 including the step of then increasing fueling so as to increase the carbon monoxide (CO) content of exhaust passing through the catalyst during regeneration.

10. A method as set forth in claim 9 including the step of controlling the increased fueling to limit temperature of the exhaust to a predefined limit.

11. A method as set forth in claim 9 including the steps of measuring the elapsed time of regeneration and of terminating regeneration when the measurement of the elapsed time exceeds a predefined time limit.

12. A method as set forth in claim 11 including the steps of sensing NOx concentration in exhaust that has passed through the catalyst while the elapsed time of regeneration is being measured, and of terminating regeneration sooner than the predefined time limit if the sensed NOx concentration is below a predefined threshold.

13. A method of regenerating a NOx adsorber catalyst that adsorbs NOx in exhaust passing through an exhaust system of an internal combustion engine that has a variable valve actuation mechanism for varying the opening and closing times of intake valves that control flow into cylinders of the engine from an intake system, the method comprising:

with the engine running under its own power, operating the variable valve actuation mechanism to change the timing of operation of the intake valves so as to transition the fuel-air ratio of mixture that is being combusted in the cylinders from a relatively leaner mixture to a mixture that is sufficiently richer than stoichiometric to effectively regenerate the catalyst, including the steps of measuring the elapsed time of regeneration, of sensing NOx concentration in exhaust that has passed through the catalyst while the elapsed time of regeneration is being measured, and of terminating regeneration at the earlier occurrence of a) the elapsed time exceeding a predefined time limit, and b) the sensed NOx concentration being below a predefined threshold.

14. A diesel engine comprising:

multiple engine cylinders within which combustion occurs and a kinematic mechanism, including pistons that reciprocate within the cylinders, through which energy of combustion is converted to a torque output;

an intake system, including a turbocharger, through which charge air is delivered to the cylinders;

intake valves for controlling communication of the cylinders with the intake system;

an exhaust system through which products of combustion are exhausted from the cylinders, including a NOx adsorber catalyst for adsorbing Nox in exhaust passing through the exhaust system to prevent their introduction into the ambient surroundings;

exhaust valves for controlling communication of the cylinders with the exhaust system;

a variable valve actuation mechanism for varying the opening and closing times of the intake valves and the exhaust valves;

a control for controlling engine operation, including controlling the variable valve actuation mechanism, the control comprising an operating program for regenerating the NOx adsorber catalyst while the engine is running under its own power by causing the variable valve actuation mechanism to change the timing of operation of the intake valves so as to transition the fuel-air ratio of mixture that is being combusted in the cylinders from a relatively leaner mixture to a mixture that is sufficiently richer than stoichiometric to effectively regenerate the catalyst and to change the timing of operation of the exhaust valves in coordination with control of the turbocharger so as to provide some degree of internal exhaust gas recirculation within the cylinders 15. A diesel engine as set forth in claim 14 wherein the operating program causes the variable valve actuation mechanism to change the timing of operation of the intake valves by advancing the closing of the intake valves toward bottom dead center.

16. A diesel engine as set forth in claim 14 including a sensor for sensing NOx concentration in exhaust that has passed through the catalyst, and wherein the operating program initiates the regeneration method when the sensed NOx concentration exceeds a predefined threshold.

17. A diesel engine as set forth in claim 14 wherein the operating program estimates the rate at which NOx is being generated, calculates from the estimate the amount of NOx adsorbed by the catalyst, and initiates the regeneration method when the calculation exceeds a predefined threshold.

18. An internal combustion engine comprising:
multiple engine cylinders within which combustion occurs and a kinematic mechanism, including pistons that reciprocate within the cylinders, through which energy of combustion is converted to a torque output:
an intake system through which charge air is delivered to the cylinders:
intake valves for controlling communication of the cylinders with the intake system;
an exhaust system through which products of combustion are exhausted from the cylinders, including a NOx adsorber catalyst for adsorbing NOx in exhaust passing through the exhaust system to prevent their introduction into the ambient surroundings;
exhaust valves for controlling communication of the cylinders with the exhaust system;
a variable valve actuation mechanism for varying the opening and closing times of at least the intake valves;
a control for controlling engine operation, including controlling the variable valve actuation mechanism, the control comprising an operating program for regenerating the NOx adsorber catalyst while the engine is running under its own power by causing the variable valve actuation mechanism to change the timing of operation of the intake valves so as to transition the fuel-air ratio of mixture that is being combusted in the cylinders from a relatively leaner mixture to a mixture that is sufficiently richer than stoichiometric to effectively regenerate the catalyst,
wherein the operating program causes the variable valve actuation mechanism to change the timing of operation of the intake valves by retarding the closing of the intake valves during compression strokes of pistons in the cylinders.

19. An internal combustion engine comprising:
multiple engine cylinders within which combustion occurs and a kinematic mechanism, including pistons that reciprocate within the cylinders, through which energy of combustion is converted to a torque output;
an intake system through which charge air is delivered to the cylinders;
intake valves for controlling communication of the cylinders with the intake system;
an exhaust system through which products of combustion are exhausted from the cylinders, including a NOx adsorber catalyst for adsorbing NOx in exhaust passing through the exhaust system to prevent their introduction into the ambient surroundings;
exhaust valves for controlling communication of the cylinders with the exhaust system;
a variable valve actuation mechanism for varying the opening and closing times of at least the intake valves;
a control for controlling engine operation, including controlling the variable valve actuation mechanism, the control comprising an operating program for regenerating the NOX adsorber catalyst while the engine is running under its own power by causing the variable valve actuation mechanism to change the timing of operation of the intake valves so as to transition the fuel-air ratio of mixture that is being combusted in the cylinders from a relatively leaner mixture to a mixture that is sufficiently richer than stoichiometric to effectively regenerate the catalyst,
wherein the variable valve actuation mechanism also varies the opening and closing times of the exhaust valves that control flow from the cylinders into the exhaust system, and the operating program operates the variable valve actuation mechanism to change the timing of operation of the exhaust valves so as to provide some degree of internal exhaust gas recirculation within the cylinders as the catalyst is being regenerated.

20. An internal combustion engine as set forth in claim 19 wherein the engine further includes a turbocharger operated by the exhaust for boosting pressure in the intake system, and the operating program causes the turbocharger to assume an operating condition that causes pressure in the intake system to be substantially equal to pressure in the exhaust system as the catalyst is being regenerated.

21. An internal combustion engine as set forth in claim 20 wherein the operating program then causes increased fueling so as to increase the carbon monoxide (CO) content of exhaust passing through the catalyst during regeneration and controls the increased fueling to limit temperature of the exhaust to a predefined limit.

22. An internal combustion engine as set forth in claim 19 wherein the operating program then increases fueling so as to increase the carbon monoxide (CO) content of exhaust passing through the catalyst during regeneration.

23. An internal combustion engine as set forth in claim 22 wherein the operating program controls the increased fueling to limit temperature of the exhaust to a predefined limit.

24. An internal combustion engine as set forth in claim 22 wherein the operating program measures the elapsed time of regeneration and terminates regeneration when the measurement of the elapsed time exceeds a predefined time limit.

25. An internal combustion engine as set forth in claim 24 including a sensor for sensing NOx concentration in exhaust that has passed through the catalyst, and wherein the operating program terminates regeneration sooner than the predefined time limit if the sensed NOx concentration is below a predefined threshold.

26. An internal combustion engine comprising:
multiple engine cylinders within which combustion occurs and a kinematic mechanism, including pistons that reciprocate within the cylinders, through which energy of combustion is converted to a output
an intake system through which charge air is delivered to the cylinders;
intake valves for controlling communication of the cylinders with the intake system;
an exhaust system through which products of combustion are exhausted from the cylinders, including a NOx adeorber catalyst for adsorbing NOx in exhaust passing through the exhaust system to prevent their introduction into the ambient surroundings;
exhaust valves for controlling communication of the cylinders with the exhaust system;
a variable valve actuation mechanism for varying the opening and closing times of at least the intake valves;
a control for controlling engine operation, including controlling the variable valve actuation mechanism, the control comprising an operating program for regenerating the NOx adsorber catalyst while the engine is running under its own power by causing the variable valve actuation mechanism to change the timing of operation of the intake valves so as to transition the fuel-air ratio of mixture that is being combusted in the cylinders from a relatively leaner mixture to a mixture that sufficiently richer than stoichiometric to effectively regenerate the catalyst, including a sensor for sensing NOx concentration in exhaust that has passed through the catalyst, and wherein the operating program measures the elapsed time of regeneration and terminates regeneration at the earlier occurrence of a) the elapsed time exceeding a predefined time limit, and b) the sensed NOx concentration being below a predefined threshold.

27. A control for controlling a variable valve actuation mechanism of an internal combustion engine to regenerate a Nox adsorber catalyst in an exhaust system of the engine while the engine is running under its own power by causing the variable valve actuation mechanism to retard the timing of closing of the intake valves during compression strokes of pistons in cylinders of the engine so as to transition the fuel-air ratio of mixture that is being combusted in the cylinders from a relatively leaner mixture to a mixture that sufficiently richer than stoichiometric to effectively regenerate the catalyst.

* * * * *